United States Patent
Seeman et al.

(10) Patent No.: US 9,286,268 B2
(45) Date of Patent: Mar. 15, 2016

(54) METHOD AND AN APPARATUS FOR FAST CONVOLUTION OF SIGNALS WITH A ONE-SIDED EXPONENTIAL FUNCTION

(71) Applicant: Brno University Of Technology, Brno (CZ)

(72) Inventors: Michal Seeman, Brno (CZ); Pavel Zemčík, Brno (CZ); David Bařina, Brno (CZ)

(73) Assignee: Brno University of Technology, Brno (CZ)

( * ) Notice: Subject to any disclaimer, the term of this patent is extended or adjusted under 35 U.S.C. 154(b) by 225 days.

(21) Appl. No.: 14/105,129

(22) Filed: Dec. 12, 2013

(65) Prior Publication Data
US 2015/0169498 A1 Jun. 18, 2015

(51) Int. Cl.
*G06F 17/15* (2006.01)
(52) U.S. Cl.
CPC ...................................... *G06F 17/15* (2013.01)
(58) Field of Classification Search
None
See application file for complete search history.

(56) References Cited

U.S. PATENT DOCUMENTS

| | | | | |
|---|---|---|---|---|
| 5,808,574 A | * | 9/1998 | Johnson | G06J 1/00 341/110 |
| 6,009,447 A | * | 12/1999 | Kubota | G06T 5/20 708/308 |
| 6,324,559 B1 | * | 11/2001 | Hellberg | H03H 17/0213 708/315 |
| 6,366,872 B1 | * | 4/2002 | Fetler | G01R 33/4625 702/124 |

OTHER PUBLICATIONS

Seeman, M., Zemcik, P: Histogram Smoothing for Bilateral Filter, Proc. GraVisMa, Plzen, Czech Rep., pp. 145-148, 2009.

* cited by examiner

*Primary Examiner* — Michael D Yaary
(74) *Attorney, Agent, or Firm* — pkalousek.ip

(57) ABSTRACT

A method and an apparatus embodying the method for fast convolution of a signal with a one-sided exponential function is disclosed. Additionally, a method and a system embodying the method for fast convolution of a signal with complex exponential function localized around an origin by an exponential function envelope utilizing the method and a system embodying the method for fast convolution of a signal with a one-sided exponential function is disclosed.

20 Claims, 8 Drawing Sheets

METHOD AND AN APPARATUS FOR FAST CONVOLUTION OF SIGNALS WITH A ONE-SIDED EXPONENTIAL FUNCTION

BACKGROUND

1. Field

The present disclosure relates to digital signal processing. More particularly, this invention is directed toward a fast convolution of a signal with a one-sided exponential function.

2. Description of Related Technology

Many fields of engineering and science utilize convolution of a signal of interest with a kernel comprising a class of symmetric functions. Such a class may comprise, e.g., finite window functions such as cosine window, raised cosine window, Lanczos window with small radius, as well as infinite functions like Gaussian function, Gabor atoms (or functions), specifically designed low pass filters, and other symmetric functions known to a person of ordinary skills in the art.

A convolution of a signal with a kernel comprising Gaussian function finds use in such fields as speech recognition, signal equalization, image processing and other fields known to a person of ordinary skills in the art. By means of an example, an edge detection in a signal comprising an image takes an advantage of the fact that the edges of the objects in the image with a characteristic size or spacing related to the widths of the Gaussian functions appear as zero values. By means of another example, Gabor functions, are frequently used as kernels for time-frequency analysis, e.g., feature extraction, especially in texture-based image analysis (e.g. classification, segmentation or edge detection), iris recognition. By means of yet another example, raised cosine function is frequently used as a kernel in matched filters.

A traditional approach to calculating a convolution is to implement the convolution through direct numerical computation between the signal of interest and the kernel, corresponding to a function from, e.g., the above-discussed class of functions. However, in applications, where computational time is critical, such implementation is not suitable and is desired to be improved.

One approach is disclosed in a document by Seeman, M., Zeměik, P., entitled Histogram Smoothing for Bilateral Filter, Proc. GraVisMa, Plzen, Czech Rep., pp. 145-148, 2009. As disclosed therein, the approach considers a kernel comprising Gaussian function. One half of the Gaussian function is approximated by one or more exponential functions, thus decreasing the computational complexity form (m×n) (where n is the number of signal samples and m is the size of the convolution kernel) to n (where n is the number of the signal samples). The convolution with the exponential function is then calculated in a forward direction, i.e., for signal samples starting with the first sample and then in a reverse direction, i.e., for signal samples starting with the last sample. The result of the forward and reverse calculations are then added together.

A problem with this approach is that due to the need for calculation in a forward and reverse directions, the entire signal must be known in advance; therefore, only post-processing of a signal that has been acquired is feasible.

However, many engineering and scientific processes produce signals, which are not necessary finite, e.g., speech, motion pictures, and other signals known to a person of ordinary skills in the art. Accordingly, there is a need in the art for a fast convolution of a signal with an exponential function, used, e.g., to approximate kernels comprising a class of symmetric functions, thus providing a solution to the above identified problem, enabling calculation of convolution of such kernels with both definite and indefinite signals, as well as providing additional advantages.

SUMMARY

In an aspect of the disclosure, an apparatus and a method for fast convolution of a signal with a one-sided exponential function according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Figure 1:
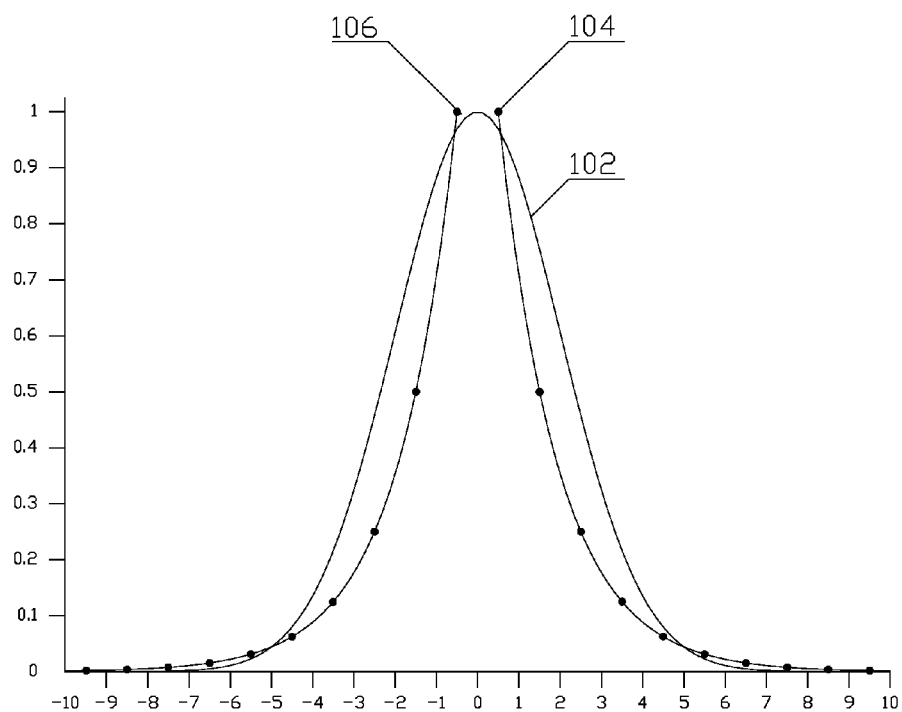
FIG. 1, depicts a symmetrical function approximated by a one-sided and a mirrored one-sided exponential functions.

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," an and the are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

One-dimensional symmetric functions that can be approximated by an exponential function are denoted as w(t), where the t is an independent variable. By means of an example, the well-known one-dimensional Gaussian function G(t) is defined as:

$$G(t) = e^{\frac{-t^2}{2\sigma^2}}$$ Eq. (1)

where σ is standard deviation. As well known the equation evaluated over the independent variable can be depicted as the well known symmetrical, bell-shaped curve. By means of another example(s) a raised cosine window C(t) is defined as:

$$C(t) = \frac{1}{2} + \frac{1}{2}\cos\frac{\pi t}{R}$$ Eq. (2)

where R is radius. By means of yet another example, Lanczos window is used for signal re-sampling with a radius equal to two signal samples. Lanczos window L(t) is defined as $$L(t) = \mathrm{sinc}\frac{\pi t}{S}\mathrm{sinc}\frac{\pi t}{2S}$$ Eq. (3)

where S is distance between the samples of the signal to which the original signal is being re-sampled.

As understood by a person of ordinary skills in the art, not every function has an analytical expression. By means of an example, a process may possess a functional relationship between an independent variable and the observed variable. As long as the relationship can be approximated by a sum of one or more exponential functions, which possesses an analytical expression, the function is within the scope of this disclosure.

One half of any of the symmetrical functions w(t) to be used as a kernel, can be approximated as a sum of one or more exponential functions, wherein the approximation by one exponential curve is defined as:

$$w(t) \propto (1-\alpha)^{-n}$$ Eq. (4)

where ∝ indicates approximation; α is a constant determining approximation via the decay constant (1−α)<1; and n is an exponent. The constant α may be determined by any approximation method known to a person of ordinary skills in the art, e.g., the least squares method.

Thus, referring now to FIG. 1, a function 102, symmetrical about a vertical axis at origin is depicted. A single one sided exponential function 104 approximating one side of the symmetrical function 102 was determined by the least square error. To approximate the symmetrical function 102, the one sided exponential function 104 was mirrored about the vertical axis at origin to yield a one sided exponential function 106. The dots on the exponential functions 104, 106, indicate values in sampling points. Therefore, it is understood that in order to obtain an approximation of the symmetrical function 102 by a function comprising the two one sided exponential functions 104, 106, the sampled mirrored function 106 must be moved one sample forward and summed with the non-mirrored sampled function 104.

Figure 2:
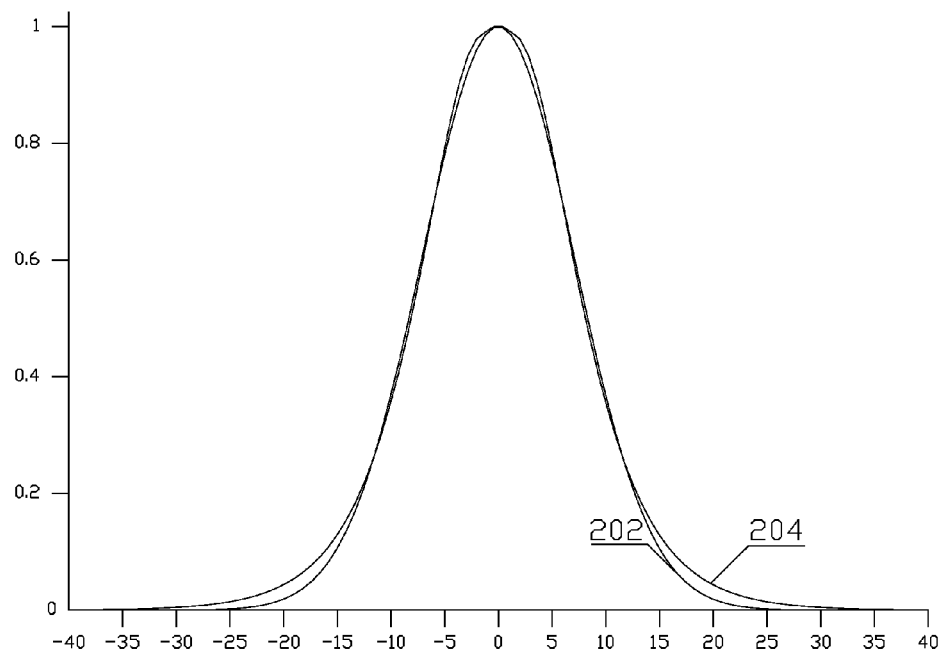
FIG. 2 depicts a symmetrical function approximated by three one-sided and the three mirrored one-sided exponential functions.

A person of ordinary skills in the art will understand that a single exponential is used for clarity of explanation without a loss of any generality, and extension to a plurality of exponential functions, should the approximation error be unacceptable, is an application of a principle of superposition. Thus by means of an example, FIG. 2 depicts a function 202, symmetrical about a vertical axis at origin, approximated by three exponential functions 204. Clearly, the approximation error of the curve 204 has decreased in comparison with the curve 104, 106.

A convolution of a first half of the symmetrical function w(t) approximated by Eq. (4) with a signal of interest f(m) yields an Exponential Moving Average (EMA):

$$E_\alpha(n,f) = \Sigma_{m=-\infty}(1-\alpha)^{n-m} \cdot f(m)$$ Eq. (5)

Instead of calculating the EMA directly from Eq. (5), a recursive relationship may be used:

$$E_\alpha(n,f) = f(n) + (1-\alpha) \cdot E_\alpha(n-1,f)$$ Eq. (6)

Figure 3:
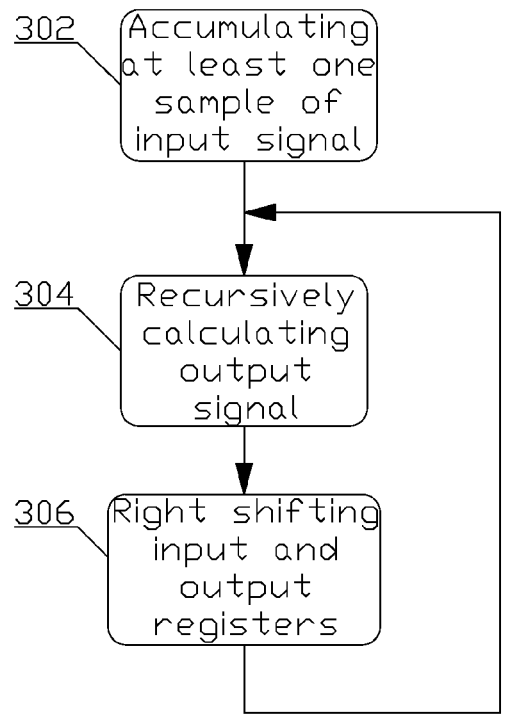
FIG. 3 depicts a flow chart of a process for calculating a convolution of exponential function with a signal in accordance with known aspect.
Figure 4:
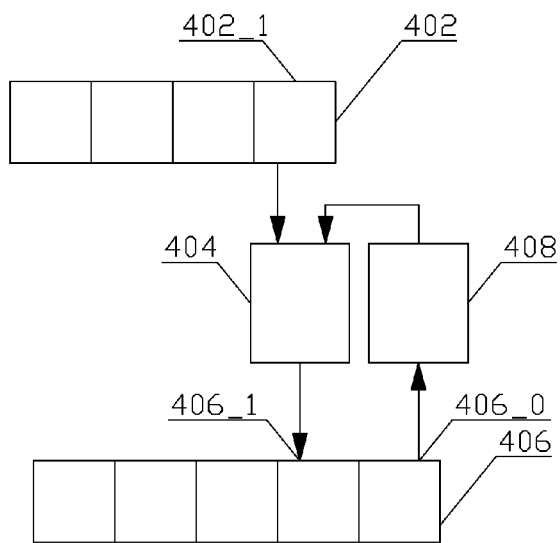
FIG. 4 depicts a conceptual structure for calculating a convolution of exponential function with a signal in accordance with known aspect.

Referring to FIG. 3, a flow chart of a process for calculating a convolution of exponential function with a signal is disclosed. To further clarify the relationship between certain elements of the conceptual structure implementing the process depicted in FIG. 4, references to structural elements of FIG. 4 are in parenthesis.

In block 302, a number of input signal f(m) samples (404) are accumulated into a memory structure, e.g., a register (402). A person of ordinary skills in the art will understand that since the recursive relationship of Eq. (6) operates on only one input signal sample, only a register position (402_1) must contain the input signal sample before the recursion may start. Consequently, the size of the register (402) must comprise at least one position (402_x). The process continues in block 304.

In block 304, the recursive calculation of a sample of the output signal is carried out. The first sample of the signal in the register position (402_1) is provided to a first input of a block (404). A previously calculated sample of the output signal in a position (406_0) of an output register (406) is provided to a block (408) where the sample is multiplied by (1−α) and the result of the multiplication is provided to a second input of the block (404). In the block (404), the two input signals are summed together and provided as an output sample (406_1) into the register (406). A person of ordinary skills in the art will understand that since the recursive relationship of Eq. (6) operates on a previously calculated output signal sample in register position (406_0) and outputs to a different register position (406_1), the register (406) must comprise at least two positions (406_x). The process continues in block 306.

In block 306, the signal samples in both the input register (402) and the output register (406) are shifted one position to the right, so that the register position (402_1) holds the second sample of the input signal, the register position (406_0) holds the previously calculated sample of the output signal, and the register position (406_1) is empty. The process continues in block 304.

To calculate the other half of the symmetrical function w(t) approximated by Eq. (4) with the signal of interest f(m), the function $(1-\alpha)^{-n}$ used in Eq. (5) must be mirrored, i.e., a function $(1-\alpha)^{+n}$ must be used. Considering Eq. (4) for such mirrored function, a recursive relationship may be used:

$$E_\alpha(n, f) = \frac{1}{1-\alpha} \cdot E_\alpha(n+1, f) - f(n+1) \qquad \text{Eq. (7)}$$

Examining Eq. (7) two observations can be made. The first one is that the relationship is non-causal, since the output, i.e., the $E_\alpha(n,f)$ depends only on one sample of the signal f(m) and one $E_\alpha(n+1, f)$ in the future. Furthermore, the initial condition for Eq. (7) is determined as:

$$E_\alpha(N,f) = E_{m=0}^{N}(1-\alpha)^{N-m} \cdot f(n) \qquad \text{Eq. (8)}$$

where N is the last sample of the signal f(m). However, since as discussed supra, the signal f(m) has, at least in theory, infinite length practical realization of Eq. (8) is impossible.

The second observation concerns the coefficient $$\frac{1}{1-\alpha},$$

a power of which grows with a number of samples of the signal f(m) up to the power of N. The number of significant digits in a result of a multiplication is a sum of the number of significant digits representing the factors in the multiplication. Since a calculation of a power of a number is implemented as multiplication, it follows that the required precision, i.e., the size of an accumulator holding the significant digits of the multiplication grows with the number of samples of the signal N. However, it is clear from Eq. (7) that all the significant digits must be retained. Thus for an infinite signal length, the precision would have to be infinite, which means that practical realization of Eq. (7) would be impossible in any hardware.

To resolve these issues, the mirrored function $(1-\alpha)^{+n}$ is truncated to a pre-determined number of samples W. Consequently, the initial condition given by the Eq. (8), can now be evaluated, because the contribution of the signal f(m) to the initial condition is calculated over a limited number of samples N=W. However, the truncation causes an approximation error $E_k$ in the kernel summation, given as:

$$E_k = -\frac{(1-\alpha)^W}{\alpha} \qquad \text{Eq. (9)}$$

Because the approximation error $E_k$ decreases with increasing number W, the pre-determined number W may be determined in accordance with an approximation error $E_k$ acceptable for a particular application.

Once the pre-determined number W is determined, the required number of the significant digits can be calculated. After W multiplications by $(1-\alpha)$, the number of significant digits needed for infinite precision is exactly the number of significant digits needed to express $(1-\alpha)^W$, which in the worst case is:

$$W \cdot d \qquad \text{Eq. (10)}$$

where d is the number of significant digits needed to express the decay constant $(1-\alpha)$.

Figure 5:
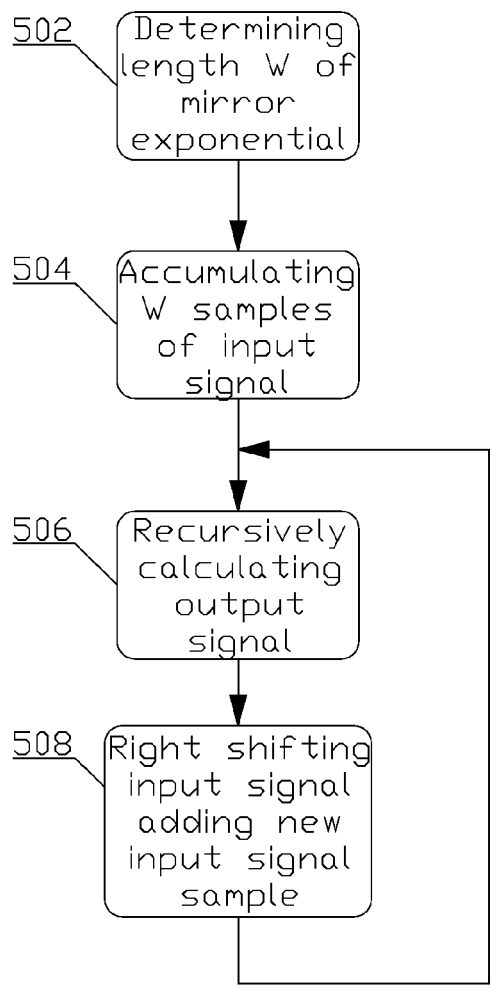
FIG. 5 depicts a flow chart of a process for calculating a convolution of mirrored exponential function with a signal in accordance with an aspect of this disclosure.
Figure 6:
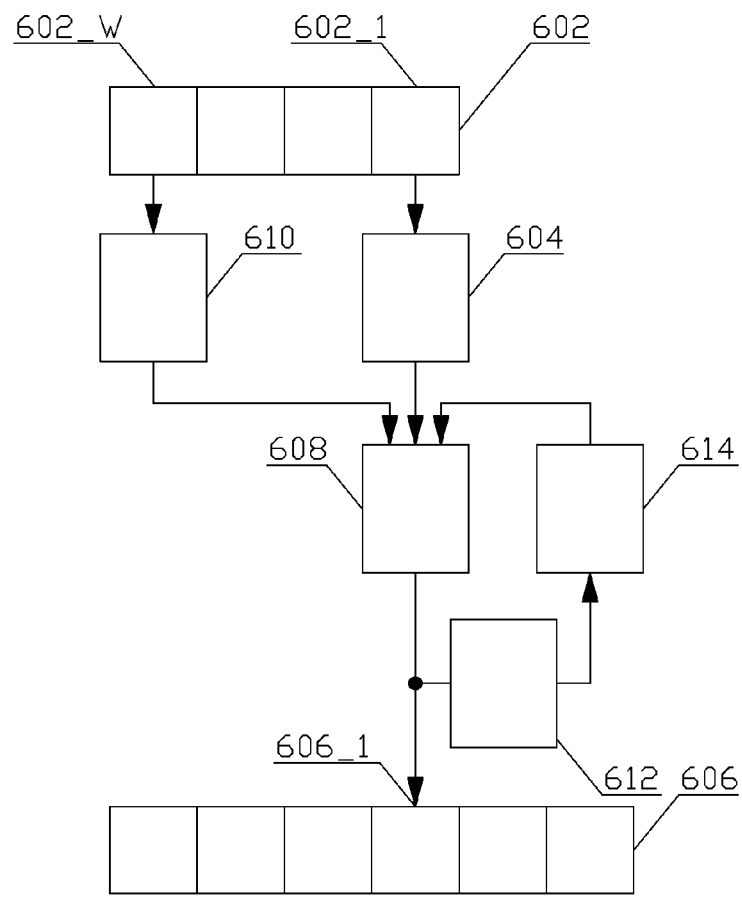
FIG. 6 depicts a conceptual structure for calculating a convolution of mirrored exponential function with the signal in accordance with an aspect of this disclosure.

Referring now to FIG. 5, a flow chart of a process for calculating a convolution of mirrored exponential function with a signal is disclosed. To further clarify the relationship between certain structural elements of the conceptual structure implementing the process depicted in FIG. 6, references to structural elements of FIG. 6 are in parentheses.

The process starts in block 502, where a number W, determining the length of the mirrored function $(1-\alpha)^{+n}$ is determined as disclosed supra. The process continues in block 504.

In block 504, a number of input signal f(m) samples (602_1-602-W) equal to the number W is accumulated to a memory structure, e.g., a register (602). The process continues in block 506.

In block 506, the recursive calculation of a sample of the output signal (606_1) is carried out. The first sample of the signal in a register position (602_1) is multiplied by −1 in multiplier (604) and is provided on the first input of a block (608). The W—the sample of the signal in a register position (602_W) is multiplied by the last sample of the truncated mirrored function $(1-\alpha)^{+W}$ in a multiplier (610) and is provided on the second input of the block (608). The content of the accumulator (612), is multiplied by $$\frac{1}{1-\alpha}$$

in a block (614) and provided on the third input of the block (608). In the block (608), the three input signals are summed together and provided both to the accumulator (612) and as the output sample (606_1) in a register (606). The process continues in block 508

In block 508, the signal samples in the register (602) are shifted one position to the right, so that the register position (602_1) holds the second sample of the signal, and new sample of the signal is written into the now empty register position (602_W). Concurrently, the signal samples in the register (606) are shifted one position to the right, so that the register position (606_1) is empty. The process continues in block 506.

Figure 7:
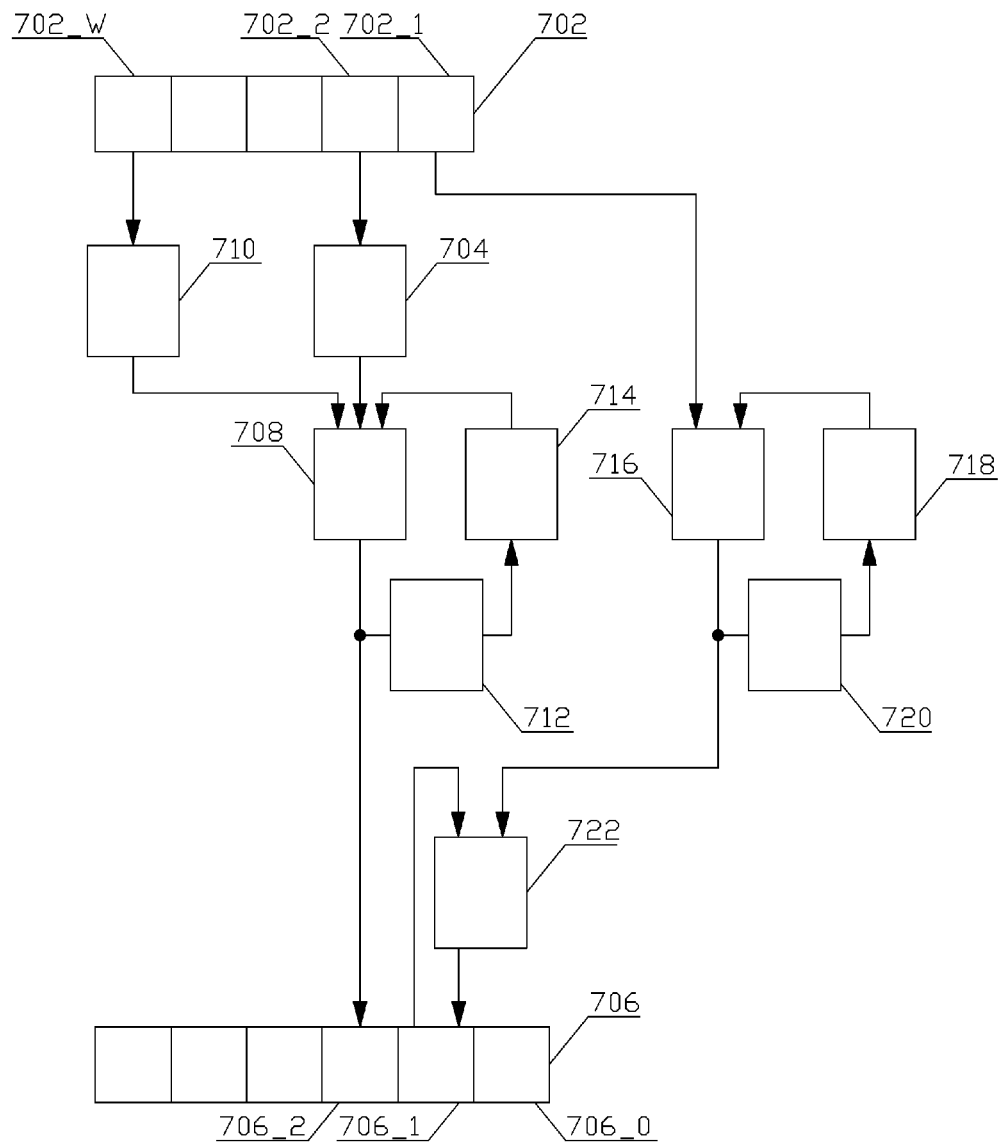
FIG. 7 depicts a conceptual structure for calculating a convolution of two sided exponential function with a signal in accordance with an aspect of this disclosure.

Because as disclosed supra, both calculations use only a shift of input signal to the right, the process disclosed in FIG. 3 and FIG. 5, embodied in conceptual structures of FIG. 4 and FIG. 6, may be used for calculation of a convolution of two-sided exponential function with an input signal. A conceptual structure for such a calculation is depicted in FIG. 7.

Considering a process for calculation of the convolution of signal f(m) with the two-sided exponential function, the calculation of the convolution of signal f(m) with the mirrored exponential function is identical to the process disclosed in FIG. 5 and associated text, supra; therefore, is not repeated to avoid undue repetitiveness.

When the process of calculating a sample of the convolution of signal f(m) with the mirrored exponential function is finished, and the samples in the register 702 are shifted one position to the right, thus the sample of the signal f(m) is shifted from the register position 702_2 to the register position 702_1. Consequently, the calculation of the convolution of signal f(m) with the exponential function may start by providing the sample of the signal in the register position 702_1 to a first input of a block 716. Concurrently with the shift of the samples in the register 702, the samples in the register 706 are shifted one position to the right, so that the register position 7062 is empty and the register position 706_1 contains the sample of a convolution of the signal f(m) with the mirrored exponential function.

Since the sample in the register position 706_1 is to be summed with a sample of a convolution of signal f(m) with the exponential function, the sample in the register position 706_1 is removed from the register and provided to a first input of an block 722. Block 722 sums the sample provided from the register position 706_1 with the sample of a convolution of signal f(m) with the exponential function provided to a second input of an block 722. The output of the block 722 is then written back into the register position 706_1.

It thus follows that the sample in the register position 706_0 is likewise a sum of a sample of a convolution of the signal f(m) with the mirrored exponential function and a sample of a convolution of the signal f(m) with the exponential function. Consequently, the sample in the register position 706_1 cannot be used as the previous term $E_\alpha(n-1, f)$ of the recursion given by Eq. (6). Therefore, block 720 serves as an accumulator, which holds the previous term $E_\alpha(n-1, f)$ provided to the block 722 by the output of block 716, which together with block 718 calculates convolution of signal f(m) with the exponential function. Because the convolution calculation by block 716 and block 718 is identical to the calculation as disclosed in FIG. 4 and associated text in regards to blocks 404 and 408, the description is not repeated to avoid undue repetitiveness.

A person of ordinary skills in the art will understand that the above-disclosed structure may in one aspect be implemented as individual hardware blocks, e.g., a multiplier, an accumulator, a summer. In another aspect, the functionality of the blocks, e.g., multiplication, accumulation, summation, may be implemented as software entities on a processing unit. In yet another aspect, the implementation may comprise a mixture of hardware and software entities.

The above disclosed calculation of fast convolution may be extended to a complex exponential function $e^{-j\omega t}$ localized around an origin by any of the symmetric functions that can be approximated by an exponential function envelope w(t):

$$\hat{g}(t) = e^{-j\omega t} \cdot w(t) \qquad \text{Eq. (11)}$$

where the $\hat{g}(t)$ is a complex function.

As discussed supra, of a particular interest is a Gabor function, comprising the complex exponential function $e^{-j\omega t}$ localized around an origin by Gaussian function envelope:

$$\hat{H}(t) = e^{-j\omega t} \cdot e^{\frac{-t^2}{2\sigma^2}} \qquad \text{Eq. (12)}$$

However, since the fast convolution as disclosed herein is by no means limited to Gabor function, the general function expressed by Eq. (11) is used.

Convolution $\hat{F}(n,\hat{f})$ of input signal $\hat{f}(t)$ with the function $\hat{g}(t)$ can be expressed as:

$$\hat{F}(n,\hat{f}) = \Sigma_m \hat{g}(m-n)\hat{f}(m) \qquad \text{Eq. (13)}$$

Substituting Eq. (11) into Eq. (13) yields:

$$\hat{F}(n,\hat{f}) = \Sigma_m e^{-j\omega(m-n)} w(m-n)\hat{f}(m) \qquad \text{Eq. (14)}$$

The term $e^{-j\omega(m-n)}$ can be rewritten as $e^{-j\omega m}e^{+j\omega n}$. The $e^{+j\omega n}$ can be factored out of the summation:

$$\hat{F}(n,\hat{f}) = e^{+j\omega n} \Sigma_m e^{-j\omega m} w(m-n)\hat{f}(m) \qquad \text{Eq. (15)}$$

The term $\hat{f}(m) \cdot e^{-j\omega m}$ can be recognized as modulation of the signal of interest $\hat{f}(m)$ by the complex exponential $e^{-j\omega m}$:

$$\hat{f}_h(m) = e^{-j\omega m}\hat{f}(m) \qquad \text{Eq. (16)}$$

Substituting Eq. (16) into Eq. (15) yields:

$$\hat{F}(n,\hat{f}) = e^{+j\omega n} \Sigma_m w(m-n)\hat{f}_h(m) \qquad \text{Eq. (17)}$$

As with Eq. (15) the right-hand side of the Eq. (17) may be recognized as a demodulation of the term $\Sigma_m w(m-n)\hat{f}_h(m)$ by the complex exponential $e^{-j\omega m}$. The convolution may be separated to the real and imaginary part $$\hat{F}(n,\hat{f}) = e^{+j\omega n} \Sigma_m w(m-n)(f_h^r(m) + jf_h^i(m)) \qquad \text{Eq. (18)}$$

$$\hat{F}(n,\hat{f}) = e^{+j\omega n}(\Sigma_m w(m-n)f_h^r(m) + j\Sigma_m w(m-n)f_h^i(m)) \qquad \text{Eq. (19)}$$

Figure 8:
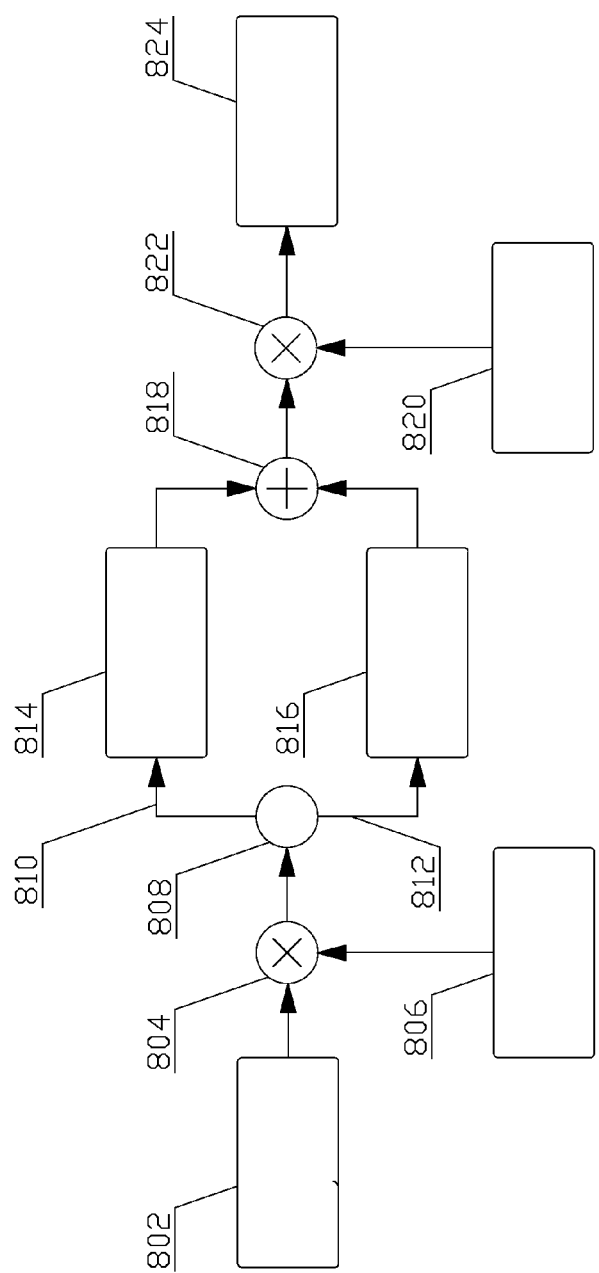
FIG. 8 depicts a conceptual structure for calculating a convolution of an exponential function localized around an origin by an exponential function approximated by two sided exponential function with a signal in accordance with an aspect of this disclosure.

Considering Eq. (13) through Eq. (19), the convolution may be separated into several stages as illustrated in FIG. 8.

A source 802 provides an input signal $\hat{f}(m)$ to be convolved with a kernel comprising the function $\hat{g}(t)$. In block 804, the input signal $\hat{f}(m)$ is modulated by a complex exponential $e^{-j\omega m}$ provided by an oscillator 806, yielding on the output of the block 804 complex signal $\hat{f}_n(m)$. The complex signal $\hat{f}_n(m)$ is split in block 808 into a real part 810 and an imaginary part 812. A convolution of two-sided exponential function, approximating the function w(t) with a real part 810 of the signal is carried out in block 814, in accordance with the process implemented by a conceptual structure as disclosed supra. Similarly, a convolution of two-sided exponential function, approximating the function w(t) with an imaginary part 812 of the signal is carried out in block 816. Output signals produced by the blocks 814 and 816 are merged in block 818. To transform the complex signal at the output of block 818, a demodulation, with the complex exponential $e^{+j\omega n}$ provided by an oscillator 820 is carried out in block 822. The output signal $\hat{f}(n, \hat{f})$ is provided to a sink 824.

A person of ordinary skills in the art will understand that the above-disclosed structure may in one aspect be implemented as individual hardware blocks, e.g., a modulator, a splitter, a demodulator. In another aspect, the functionality of the blocks, e.g., modulation, splitting, summation, may be implemented as software entities on a processing unit. In yet another aspect, the implementation may comprise a mixture of hardware and software entities.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein. By means of an example, although the processes and structures were disclosed in regards to calculation of fast convolution with an indefinite real-valued signal, a person skilled in the art will understand the processes and structures are equally applicable to complex-valued signals both for indefinite and finite signals. It is noted that a person skilled in the art would use the disclosed calculation even for finite signals because the traffic to memory, i.e., writing and reading samples is halved as compared to the previously used calculated in a forward direction, i.e., for signal samples starting with the first sample and then in a reverse direction, i.e., for signal samples starting with the last sample.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both. Thus a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for fast convolution of a signal with a one-sided exponential function minimizing memory requirement, comprising:
   truncating the one-sided exponential function to a pre-determined number W of samples;
   accumulating into a register a number of the signal samples equal to the pre-determined number W of samples; and
   for each sample of the signal
      multiplying a value in hardware accumulator by an inverse value of a decay of the exponential function;
      multiplying a value of a first sample of the signal W samples ahead from a second sample of the signal by a value of the decay of the exponential function raised to the power of the number W;
      summing the multiplied value in the hardware accumulator with the multiplied value of the first sample of the signal and with a negative value of the second sample of the signal;
      providing the summed signal to the hardware accumulator; and
      outputting the value of the summed signal.

2. The method as claimed in claim 1, wherein the truncating the exponential function to a pre-determined number of W samples comprises:
   determining the number W in accordance with an approximation error $E_k$ acceptable for an application using the fast convolution.

3. The method as claimed in claim 1, wherein the signal is a complex-valued signal.

4. A method for fast convolution of a signal with complex exponential function localized around an origin by an exponential function envelope minimizing memory requirement, comprising:
   modulating the input signal with the complex exponential function;
   accumulating into a register a number of the modulated signal samples equal to a pre-determined number W of samples of a truncated one-sided exponential function;
   splitting the modulated signal into a real part and an imaginary part;
   carrying out a fast convolution of the real part of the modulated signal with the exponential function envelope to obtain a first convolved signal;
   carrying out a fast convolution of the imaginary part of the modulated signal with the exponential function envelope to obtain a second convolved signal;
   merging the first convolved signal and the second convolved signal; and
   demodulating the merged signal with the complex exponential function.

5. The method as claimed in claim 4, wherein carrying out the fast convolution of the real part of the modulated signal with the exponential function envelope comprises:
   carrying out the fast convolution of the real part of the modulated signal with a one-sided exponential function;
   carrying out the fast convolution of the real part of the modulated signal with truncated the one-sided exponential function; and
   summing the convolved real part of the modulated signal with the one-sided exponential function with the convolved real part of the modulated signal with the truncated one-sided exponential function.

6. The method as claimed in claim 5, wherein the carrying out the fast convolution of the real part of the modulated signal with the one-sided exponential function comprises:
   for each sample of the real part of the modulated signal
      multiplying a value in a first hardware accumulator by a value of a decay of the one-sided exponential function,
      summing the multiplied value with a value of the sample of the real part of the modulated-signal,
      providing the summed value to the first hardware accumulator, and
      outputting the summed value.

7. The method as claimed in claim 5, wherein carrying out a fast convolution of the real part of the modulated signal with truncated the one-sided exponential function comprises:
   truncating the one-sided exponential function to a pre-determined number of W samples; and
   for each sample of the real part of the modulated signal
      multiplying a value in a second hardware accumulator by an inverse value of a decay of the exponential function;
      multiplying a value of a first sample of the real part of the modulated signal W samples ahead from a second sample of the real part of the modulated signal by a value of the decay of the exponential function raised to the power of the number W;
      summing the multiplied value in the second hardware accumulator with the multiplied value of the first sample of the real part of the modulated signal and with a negative value of the second sample of the real part of the modulated signal;
      providing the summed signal to the second hardware accumulator; and
      outputting the value of the summed signal.

8. The method as claimed in claim 5, wherein the carrying out the fast convolution of the imaginary part of the modulated signal with the one-sided exponential function comprises:
   for each sample of the imaginary part of the modulated signal
      multiplying a value in a third hardware accumulator by a value of a decay of the one-sided exponential function,
      summing the multiplied value with a value of the sample of the imaginary part of the modulated signal,
      providing the summed value to the first hardware accumulator, and
      outputting the summed value.

9. The method as claimed in claim 5, wherein carrying out a fast convolution of the imaginary part of the modulated signal with truncated the one-sided exponential function comprises:
   truncating the one-sided exponential function to a pre-determined number of W samples; and
   for each sample of the imaginary part of the modulated signal
      multiplying a value in a fourth hardware accumulator by an inverse value of a decay of the exponential function;
      multiplying a value of a first sample of the imaginary part of the modulated signal W samples ahead from a second sample of the imaginary part of the modulated-signal by a value of the decay of the exponential function raised to the power of the number W;
      summing the multiplied value in the hardware accumulator with the multiplied value of the first sample of the imaginary part of the modulated signal and with a negative value of the second sample of the imaginary part of the modulated signal;
      providing the summed signal to the hardware accumulator; and
      outputting the value of the summed signal.

10. An apparatus for fast convolution of a signal with a one-sided exponential function minimizing memory requirement, comprising:
   an hardware accumulator comprising a register configured to accumulate N samples of the signal, wherein N equals a pre-determined number W of samples of a truncated one-sided exponential function;
   a first multiplier configured to multiply a value in the hardware accumulator by an inverse value of a decay of the exponential function;
   a second multiplier configure to multiply a value of a first sample of the signal W samples ahead from a second sample of the signal by the value of the decay of the exponential function raised to the power of the number W; and
   a summer configured to
      sum the multiplied value in the hardware accumulator with the multiplied value of the first sample of the signal and with a negative value of the second sample of the signal,
      provide the summed value to the hardware accumulator, and
      output the summed value.

11. The apparatus as claimed in claim 1, wherein the number W is pre-determined in accordance with an approximation error $E_k$ acceptable for an application using the fast convolution.

12. The apparatus as claimed in claim 1, wherein the hardware accumulator, the first multiplier, the second multiplier, and the summer are implemented on a processing unit.

13. The apparatus as claimed in claim 1, wherein the signal is a complex-valued signal.

14. An apparatus for fast convolution of a signal with complex exponential function localized around an origin by an exponential function envelope minimizing memory requirement, comprising:
   a hardware modulator configured to modulate the signal with the complex exponential function;
   a hardware accumulator comprising a register configured to accumulate N samples of the signal, wherein N equals a pre-determined number W of samples of a truncated one-sided exponential function;
   a hardware splitter configured to split the modulated signal into a real part and an imaginary part; and
   a hardware processing unit configured to
      carry out a fast convolution of the real part of the modulated signal with the exponential function envelope to obtain a first convolved signal, and
      carry out a fast convolution of the imaginary part of the modulated signal with the exponential function envelope to obtain a second convolved signal;
   a hardware means for merging the first convolved signal and the second convolved signal; and
   a hardware demodulator configured to demodulate the merged signal with the complex exponential function.

15. The apparatus as claimed in claim 14, wherein the hardware modulator, the hardware splitter, the hardware means for merging, and the hardware demodulator are implemented on the processing unit.

16. The apparatus as claimed in claim 14, wherein the hardware processing unit carries out a fast convolution of the real part of the modulated signal with the exponential function envelope to obtain a first convolved signal by being configured to:
   carry out the fast convolution of the real part of the modulated signal with a one-sided exponential function;
   carry out the fast convolution of the real part of the modulated signal with truncated the one-sided exponential function; and
   sum the convolved real part of the modulated signal with the one-sided exponential function with the convolved real part of the modulated signal with the truncated one-sided exponential function.

17. The apparatus as claimed in claim 16, wherein the hardware processing unit carries out the fast convolution of the real part of the modulated signal with the one-sided exponential function by being configured to for each sample of the modulated signal:
   multiply a value in a first hardware accumulator by a value of a decay of the one-sided exponential function;
   sum the multiplied value with a value of the real part of the modulated sample of the signal;
   provide the summed value to the first hardware accumulator; and
   output the summed value.

18. The apparatus as claimed in claim 16, wherein the processing unit carries out a fast convolution of the real part of the modulated signal with truncated the one-sided exponential function by being configured to:
   truncate the one-sided exponential function to a pre-determined number of W samples; and
   for each sample of the real part of the modulated signal
      multiply a value in a second hardware accumulator by an inverse value of a decay of the exponential function;
      multiply a value of a first sample of the real part of the modulated signal W samples ahead from a second sample of the real part of the modulated signal by a value of the decay of the exponential function raised to the power of the number W;
      sum the multiplied value in the second hardware accumulator with the multiplied value of the first sample of the real part of the modulated signal and with a negative value of the second sample of the modulated signal;
      provide the summed signal to the second hardware accumulator; and
      output the value of the summed signal.

19. The apparatus as claimed in claim 16, wherein the processing unit carries out the fast convolution of the imaginary part of the modulated signal with the one-sided exponential function by being configured to for each sample of the imaginary part of the modulated signal multiply a value in a third hardware accumulator by a value of a decay of the one-sided exponential function;

sum the multiplied value with a value of the sample of the imaginary part of the modulated signal;

provide the summed value to the first hardware accumulator; and output the summed value.

20. The apparatus as claimed in claim 16, wherein the processing unit carries out a fast convolution of the imaginary part of the modulated signal with truncated the one-sided exponential function by being configured to:

truncate the one-sided exponential function to a pre-determined number of W samples; and for each sample of the imaginary part of the modulated signal multiply a value in a fourth hardware accumulator by an inverse value of a decay of the exponential function;

multiply a value of a first sample of the imaginary part of the modulated signal W samples ahead from a second sample of the imaginary part of the modulated signal by a value of the decay of the exponential function raised to the power of the number W;

sum the multiplied value in the fourth accumulator with the multiplied value of the first sample of the imaginary part of the modulated signal and with a negative value of the second sample of the imaginary part of the modulated signal;

provide the summed signal to the fourth hardware accumulator; and outputting the value of the summed signal.

* * * * *